United States Patent
Repasky et al.

(10) Patent No.: US 7,761,994 B2
(45) Date of Patent: Jul. 27, 2010

(54) REACTOR WITH EXPANDABLE STRUCTURE PROVIDING IMPROVED HEAT TRANSFER

(75) Inventors: John Michael Repasky, Allentown, PA (US); Robert Roger Broekhuis, Allentown, PA (US); Xiaoyi He, Orefield, PA (US)

(73) Assignee: Air Products and Chemicals, Inc., Allentown, PA (US)

(*) Notice: Subject to any disclaimer, the term of this patent is extended or adjusted under 35 U.S.C. 154(b) by 1106 days.

(21) Appl. No.: 11/435,541

(22) Filed: May 17, 2006

(65) Prior Publication Data

US 2007/0297956 A1 Dec. 27, 2007

(51) Int. Cl.
- B01D 50/00 (2006.01)
- B21D 39/03 (2006.01)
- B21D 39/08 (2006.01)
- B21D 51/16 (2006.01)

(52) U.S. Cl. .................. 29/890; 29/428; 29/890.044; 422/177; 422/180

(58) Field of Classification Search .................. 29/890, 29/890.043, 890.08, 428, 890.044, 525, 523; 422/168, 177, 179–180, 188, 221–222; 428/592, 428/593; 502/527.12–13, 527.15, 527.24
See application file for complete search history.

(56) References Cited

U.S. PATENT DOCUMENTS

| | | | |
|---|---|---|---|
| 4,340,501 A | * | 7/1982 | Davidson .................. 252/373 |
| 4,731,229 A | | 3/1988 | Sperandio |
| 6,319,877 B1 | * | 11/2001 | Christensen et al. ........ 422/177 |
| 7,022,294 B2 | * | 4/2006 | Johnston .................... 422/198 |
| 2006/0019827 A1 | | 1/2006 | Whittenberger |

FOREIGN PATENT DOCUMENTS

| | | |
|---|---|---|
| EP | 0 025 308 | 3/1981 |
| EP | 1 254 705 A1 | 11/2002 |
| WO | 01/94006 A | 12/2001 |
| WO | WO 01/94006 A2 | 12/2001 |

OTHER PUBLICATIONS

Nijhuis, et al., "Preparation of Monolithic Catalysis," Catalysis Reviews 2001, 43(4), pp. 345-380.

* cited by examiner

*Primary Examiner*—David P Bryant
*Assistant Examiner*—Alexander P Taousakis
(74) *Attorney, Agent, or Firm*—Bryan C. Hoke, Jr.

(57) ABSTRACT

A method and a reactor made by a method for increasing heat transfer from a heat source outside a vessel to the fluid inside the vessel are characterized by expanding a structure within the vessel toward the inner vessel surface so as to decrease the spacing between the structure and the vessel wall. The structure may be any of the various so-called structured packings, for example, ceramic honeycombs, metal honeycombs, plate stacks, and the like. The structure may comprise catalyst. The reactor provides high activity, low pressure drop, and high heat transfer. The reactor may be especially suitable for steam hydrocarbon reforming.

5 Claims, 8 Drawing Sheets

REACTOR WITH EXPANDABLE STRUCTURE PROVIDING IMPROVED HEAT TRANSFER

BACKGROUND OF THE INVENTION

This invention relates to a reactor and a method for making a reactor containing a structure.

Reactors containing structures with catalyst have been described, for example tubular reactors used in reforming. Structures, compared to random packings such as catalyst pellets, can produce a lower pressure drop, are not easily fluidized, and are not prone to settling or crushing. Since tubular reactors are often externally heated or cooled, another important characteristic of the reactor is related to heat transfer between the external heat source/sink and the process fluid within the reactor. Depending on the geometry of the packing, heat transfer in reactors with random packings may be greater than reactors with structures since the process fluid within the reactor with random packing is flowing randomly between the center of the tube and the tube wall.

Davidson, U.S. Pat. No. 4,340,501, describes a structure in a reactor vessel where the fluid is intermittently but controllably brought into contact with the vessel walls. As a result, Davidson states that it is possible to obtain the smooth-flow characteristics of honeycomb structures with the heat transfer characteristics of particulate beds.

In the invention according to Davidson, the process for contacting a fluid with the walls of a vessel is characterized by causing the fluid to flow alternatingly (a) through a structure within the vessel, and (b) through a space between the structure and the vessel walls. Davidson also describes an apparatus for carrying out the process comprising a vessel and a structure inside the vessel.

Since heat transfer is admittedly important, it would be desirable to further increase heat transfer between a heat source/sink outside the reactor vessel and the fluid inside the vessel.

The present invention may be particularly useful for a process and reactor for steam reforming hydrocarbons in which the process gases comprise steam and a gaseous or vaporized hydrocarbon and the structure comprises a steam-hydrocarbon reforming catalyst.

BRIEF SUMMARY OF THE INVENTION

The inventors of the present invention have discovered that further increases in heat transfer from a heat source outside the vessel to the fluid inside the vessel may be obtained by decreasing the spacing between the structure and the vessel wall.

Accordingly, the present invention relates to a method and a reactor made by a method comprising providing a vessel, introducing a structure into the vessel, and expanding the structure toward the inner vessel surface to make the reactor. The vessel has a vessel longitudinal axis, and an inner vessel surface. The structure has a plurality of substantially parallel passages having a plurality of passage longitudinal axes which are not parallel to the vessel longitudinal axis. During the step of introducing the structure into the vessel, the structure and the inner vessel surface define a first average spacing. After expanding the structure toward the inner vessel surface, the structure and the inner vessel surface define a second average spacing which is less than the first average spacing.

The method may further comprise applying a catalyst to the structure.

The step of expanding may comprise disengaging a restraint, where the restraint constrains a previously compressed structure. The method may comprise compressing the structure prior to the step of introducing the structure into the vessel; constraining the structure by a restraint during the step of introducing the structure into the vessel; and disengaging the restraint thereby expanding structure toward the inner vessel surface to make the reactor.

The structure may comprise at least two complementary structure segments and the step of expanding the structure may comprise inserting a spreader between the at least two complementary structure segments. The spreader may be at least one of a cylinder, bar, rod, plate, strip, wedge, cone, combination thereof, or other suitable shape.

The method may further comprise combining a plurality of flat plates and a plurality of corrugated plates to form a number (n) of complementary structure segments greater than 2, and assembling the number (n) of complementary segments to form the structure prior to introducing the structure into the vessel, wherein the step of expanding the structure comprises inserting a spreader between at least two of the complementary structure segments. A first complementary structure segment from the number (n) of complementary structure segments comprises a first flat plate from the plurality of flat plates and a second flat plate from the plurality of flat plates, where the second flat plate and the first flat plate are parallel. The first flat plate defines an angle with a nearest inner edge of the first complementary structure segment, wherein the angle is $$\frac{180°}{n} \pm 5°.$$

The step of expanding the structure may comprise inserting a spreader between the first complementary structure segment and a second complementary structure segment from the number (n) of complementary structure segments.

The present invention also relates to a reactor comprising a vessel and a structure. The vessel has a longitudinal axis and an inner vessel surface. The structure has a plurality of substantially parallel passages having a plurality of passage longitudinal axes which are not parallel to the vessel longitudinal axis. The vessel and the structure define a first average spacing between the structure and the inner vessel surface during introduction of the structure into the vessel. The vessel and the structure define a second average spacing between the structure and the inner vessel surface after introduction of the structure into the vessel. The second average spacing is less than the first average spacing.

The vessel may be a reformer tube. The structure may comprise catalyst.

BRIEF DESCRIPTION OF SEVERAL VIEWS OF THE DRAWINGS

FIGS. 1 (a) and (b) illustrate two sectional elevations of a cylindrical vessel and structure.

FIG. 2 illustrates, in plan view, a first embodiment according to the invention having a structure and a restraint.

FIG. 4 illustrates, in plan view, a second embodiment of the invention comprising a structure and a spreader.

FIG. 5 illustrates, in plan view, another example of the second embodiment of the invention comprising a structure and a spreader.

FIG. 8 illustrates, in plan view, another example of the first embodiment of the invention having a structure and a restraint.

DETAILED DESCRIPTION OF THE INVENTION

As used herein, the term "reactor" is defined as an apparatus used to carry out a chemical reaction.

As used herein, the term "vessel" is any walled means in which a fluid is contained and conveyed.

As used herein, the term "structure" means a flow guide having a plurality of substantially parallel passages. Substantially parallel means parallel within manufacturing tolerances.

The present invention relates to a method and a reactor made by a method comprising providing a vessel, introducing a structure into the vessel, and expanding the structure toward the inner vessel surface to make the reactor. The vessel has a vessel longitudinal axis, and an inner vessel surface. The structure has a plurality of substantially parallel passages having a plurality of passage longitudinal axes which are not parallel to the vessel longitudinal axis. During the step of introducing the structure into the vessel, the structure and the inner vessel surface define a first average spacing. After expanding the structure toward the inner vessel surface, the structure and the inner vessel surface define a second average spacing which is less than the first average spacing.

The cross-sectional shape of the vessel may be selected from various shapes, but is generally circular. Depending on the shape of the vessel, the longitudinal axis, which is the main line of direction, may be straight or curved. In order to make effective use of the flow pattern within the vessel, the vessel has a length at least 3 or at least 5 times its width. The vessel may be suitably constructed by means and using materials known in the art.

Figure 1A:
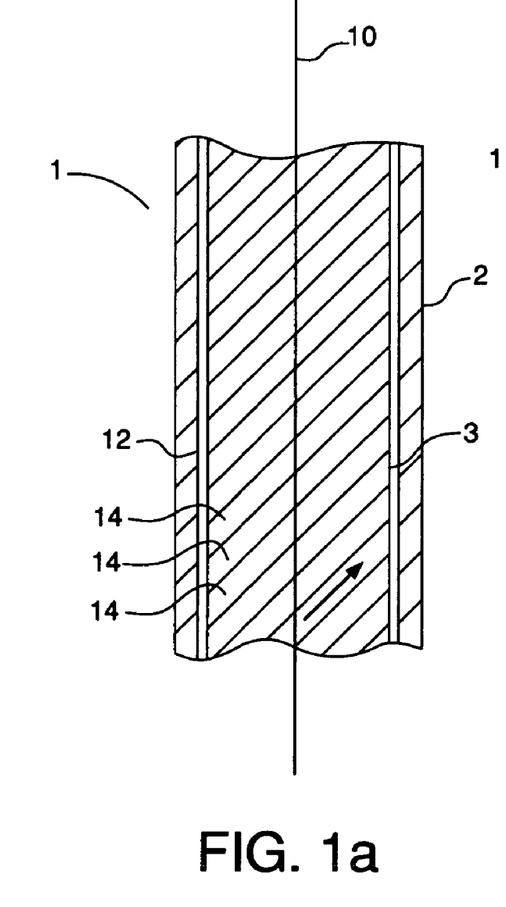
Figure 1B:
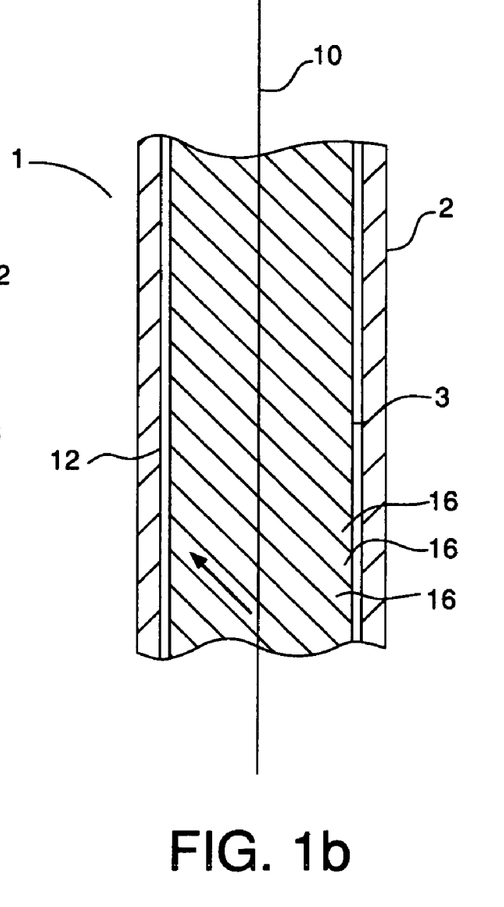

FIGS. 1a and 1b illustrate sections of a reactor 1 having vessel 2 with longitudinal axis 10 and inner vessel surface 12.

The structure may be a so-called "structured packing." Among the structures that may be used include ceramic honeycombs, metal honeycombs, plate stacks, and the like. The structure may be constructed of any material and/or alloy commonly used for structures, for example, cordierite, corundum, FeCrAlloy, 300-series stainless steels, Inconels, aluminum, or even carbon steel. Suitable materials having corrosion resistance and mechanical properties for the service for which they are to be used are known in the art.

The reactor may be a reformer and the vessel may be a steam-hydrocarbon reformer tube. In a reformer, fuel is combusted to form flames in a space outside the reformer tubes, and heat is transferred from the flames to the reformer tubes to effect an endothermic chemical reaction inside the reformer tube.

In the case of a catalytic reactor, the structure may comprise catalyst, for example nickel on alumina or other suitable catalyst known in the art for the desired catalytic reaction. The structure may carry a layer of catalyst. With the prescribed geometry of the structure comprising catalyst, reactants flow alternatingly from the wall, where they are heated, through the structure, where an endothermic reaction takes place over the catalyst.

Although described in terms of an endothermic process in which heat travels from outside the vessel inward, the present invention may also be suited for exothermic processes in which heat travels from the interior of the vessel outward.

Catalyst may be applied by any means known in the art. Catalyst may be deposited, impregnated and/or coated onto the carrier structures at any point during the catalyst fabrication process. Catalyst may be applied to plates used to form the structure or may be applied after the structure is formed. Methods for depositing, impregnating, and/or coating catalyst layers onto supporting structures are well-known in the art and described, for example, in Catalysis Reviews 2001, 43(4), 345-380.

Ceramic honeycombs may be in the form of so-call "slant cell" honeycombs, which can be made by forming a block with internal through-passages, the outer walls of which are parallel or perpendicular to the internal through-passages, and then cutting the block so that the outer walls are at a nonzero angle (i.e. angled) to the passages. Another usable form is the so-called "cross-flow" honeycomb, in which there are two or more sets of passages, the passages in any one set being mutually parallel but angled to the passages of other sets. If the passages follow a helical or tangential path with respect to the general flow direction, the honeycomb can be the product of extrusion followed by twisting of the extrudate while in a pliable condition.

Metal honeycombs may have the same geometrical variations as ceramic honeycombs.

Plate stacks are plates stacked together and may or may not have a permanent connection between them. The plates may carry surface projection high enough to keep them apart in order to form passages. The passages need not, of course, be mutually separate for all of their length. In one example of a plate stack, corrugated plates alternate with flat plates or with other corrugated plates having corrugations running at an angle to those of the first-mentioned corrugated plates. The corrugated plates may be perforated. It will be appreciated that the plates of a stack need not be flat but could be, for example, sections of a helix. The vessel may be of annular cross-section, and may provide a radial flow path in which the fluid contact alternatingly the outer and inner walls of the annular space.

Figure 2A:
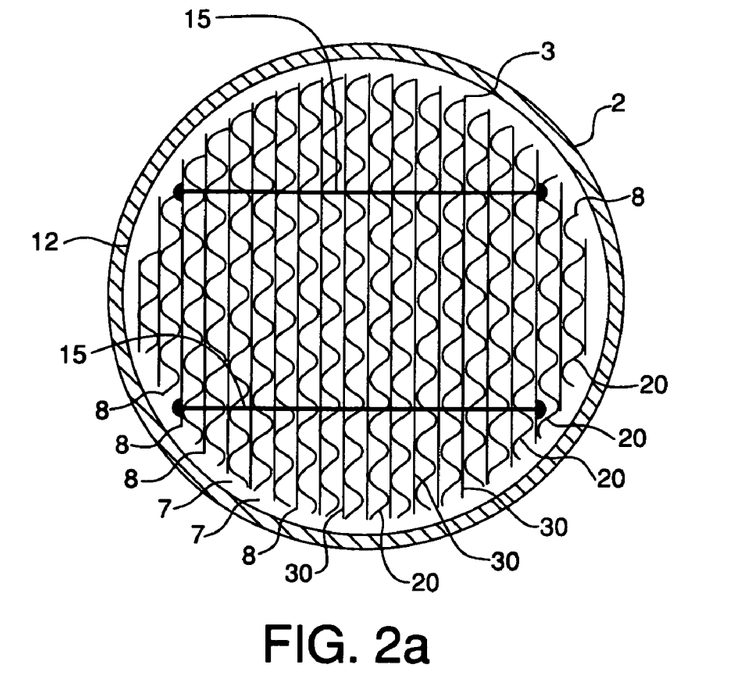
FIG. 2a illustrates a structure constrained by tie rod restraints and FIG. 2b illustrates an expanded structure and cleaved tie rod restraints.

FIG. 2a illustrates an example of a plate stack structure. Corrugated plates 20 are shown positioned between flat plates 30. This is a common style of structure and may use cross-corrugated plates having alternating angles relative to the longitudinal axis of the vessel. The structure may also be constructed without the intervening flat plates 30.

The corrugations define gas flow passages, and the orientation of these passages assures that the process gas will flow from the space between the structure and the inner vessel surface towards the inside of the structure, then back to the space, and so on. In this way heat is effectively transferred from the outside of the vessel to the process gas in the space between the structure and the inner vessel, to the interior of the structure. The structure of the present invention facilitates heat transfer to essentially all regions of the structure.

In another example of stacked plates, each plate is perforated so as to provide, in co-operation with the apertures of neighboring plates, the required passages. In principle, each plate could lie in a plane oblique to the direction of flow and could be perforated to provide passages about perpendicular to its plane. More conveniently, each plate lies in a plane approximately perpendicular or parallel to the longitudinal axis of the vessel and is perforated obliquely to its surface. Such a perpendicular arrangement requires plates of equal area for a cylindrical vessel, but the parallel arrangement requires wide plates near the vessel axis and narrow plates near the vessel walls. Very conveniently the plates may be made of expanded metal. Expanded metal is made from sheets of solid metal that are uniformly slit and stretched to create diamond- or other-shaped openings. As expanded metal is made, each row of diamond-shaped openings is offset from the next. This is standard expanded metal. The sheet can be rolled to produce flattened expanded metal.

It will be appreciated that the term "plate" includes plates that may have curvature. Their common attribute is that they are stackable together to produce the structure.

In any of its forms, the structure according to the invention has a plurality of substantially parallel passages angled to the longitudinal axis of the vessel, meaning that the longitudinal axes of the passages are not parallel to the longitudinal axis of the vessel. Substantially parallel means that the passages are parallel within manufacturing tolerances. Parallel may refer to parallel lines or parallel curves for example as it relates to spiraling structured packing.

As shown in FIGS. 1a and 1b, the structure 3 may have more than one plurality of substantially parallel passages 14, 16 having longitudinal axes that are angled to the longitudinal axis of the vessel. One group of parallel passages 14 may be at one nonzero angle relative to the longitudinal axis of the vessel while another group of parallel passages 16 may be angled at another nonzero angle relative to the longitudinal axis of the vessel, for example crosswise to parallel passages 14. This allows for the fluid to flow alternatingly through the passages and through the space in contact with the vessel walls. For the case of plate stacks using corrugated plates separated by flat plates, the adjacent passages formed from the neighboring corrugated plates may be at different angles relative to the longitudinal axis or mirrored, at the same angle but in the opposite direction as shown in FIGS. 1a and 1b. The angle of the passages relative to the longitudinal axis of the vessel is typically in the range of 20° to 80°. Usually the structure has a porosity, i.e. the ratio of passage cross-section to total cross-section, that is in the range of 30 to 99%. The cross-sectional shape of the passages may be, for example, a combination of two subparabolic half sections and parabolic section, triangular, square, rectangular, hexagonal, trapezoidal, circular, half-circular, or other desired shape.

If desired, the vessel may contain successive structure sections, which are stacked within the vessel, each structure section having structure cross-section conforming to the vessel cross-section. These structure sections may be angled with respect to one another in a prearranged or random manner. In one form, the direction of the passages is equally angled to the longitudinal axis as compared to the preceding section, but is displaced circumferentially about the longitudinal axis. In another form, the angle of the passages to the longitudinal axis is changed in successive sections. Successive structure sections may have different structure forms, for example plate stacks and metal honeycombs in the same vessel. Other systems in which a change in passage direction angle is appropriate may be readily envisaged by analogy.

The structure is desirably constructed to provide passages for process gases to provide a number of traverses of a path including one movement through a passage in the internal structure and one movement in contact with the vessel wall. The number of traverses may be at least 4, or more than 10, or in the range of 50 to 500.

Figure 3:
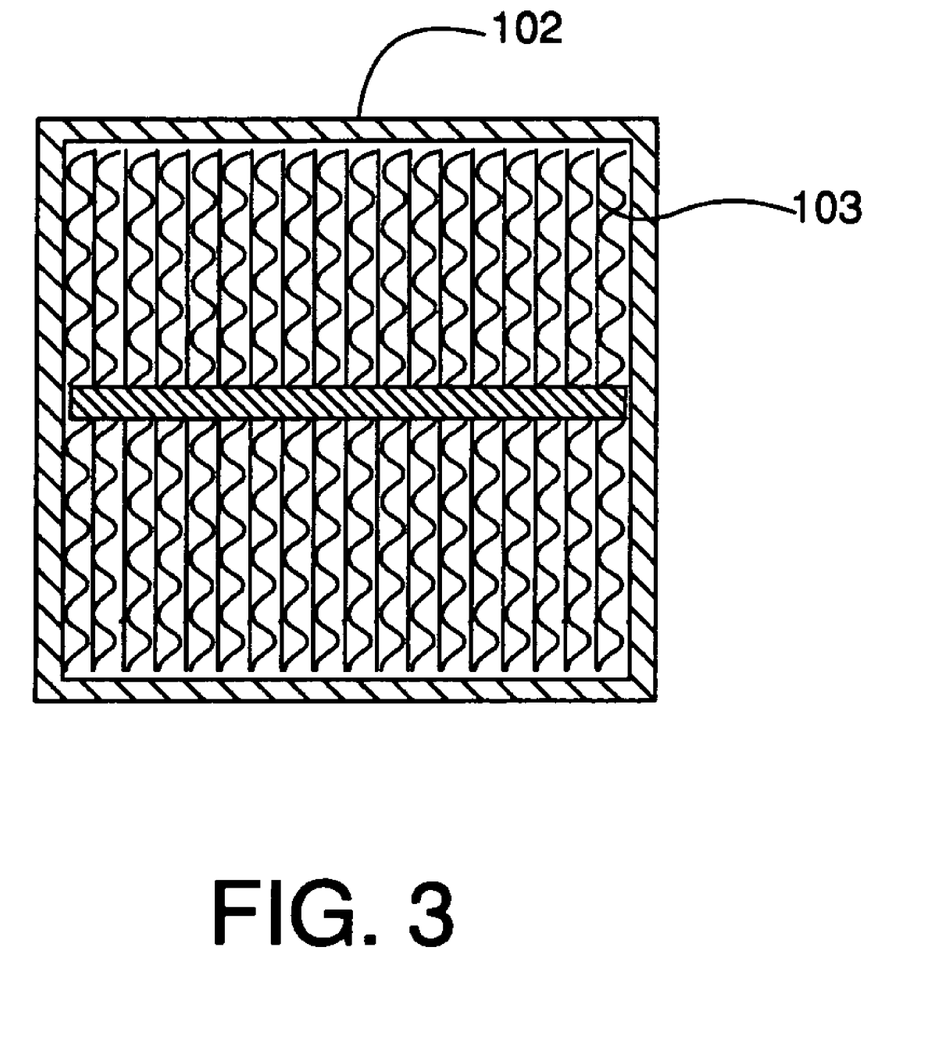
FIG. 3 illustrates, in plan view, a vessel and structure having square cross-section.

The structure has a structure cross-section conforming to the vessel cross-section. FIG. 2a shows a structure 3 and a vessel 2, each having a generally circular cross-section. FIG. 3 shows a structure 103 and a vessel 102, each having a generally square cross-section.

As shown in FIG. 2a, at any cross-section, the structure 3 will have a number of edges 8 in close proximity to the inner vessel surface 12. The inner vessel surface is the surface facing the structure. The spacings 7 are the minimum distances between edges 8 and the inner vessel surface 12. The average spacing between the structure 3 and the inner vessel surface 12 is the sum of the spacings 7 for each of the edges 8 divided by the total number of edges 8.

During the step of introducing the structure into the vessel, the structure and the vessel define a first average spacing between the structure and the inner vessel surface. A very tight or no spacing makes it difficult to introduce and remove the structure from the vessel. Some amount of spacing may be provided to allow the structure to be easily introduced into the vessel without using damaging forces. The average spacing between the structure and the inner vessel surface during the step of introducing the structure into the vessel may be, for example, 1 to 8 mm, or 2 to 4 mm.

The structure may be expanded toward the inner vessel surface by any number of means.

Figure 4A:
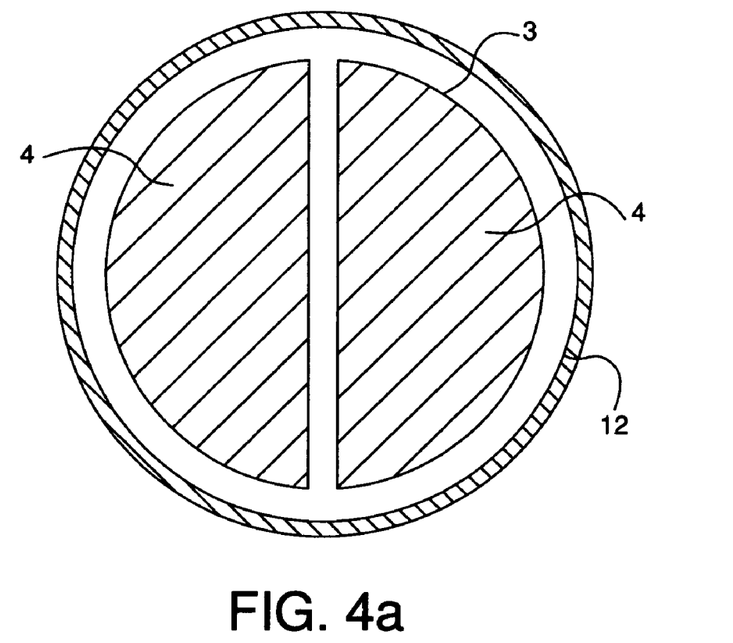
FIG. 4a illustrates a structure having two complementary structure segments and FIG. 4b illustrates an expanded structure with a spreader between the two structure segments.
Figure 4B:
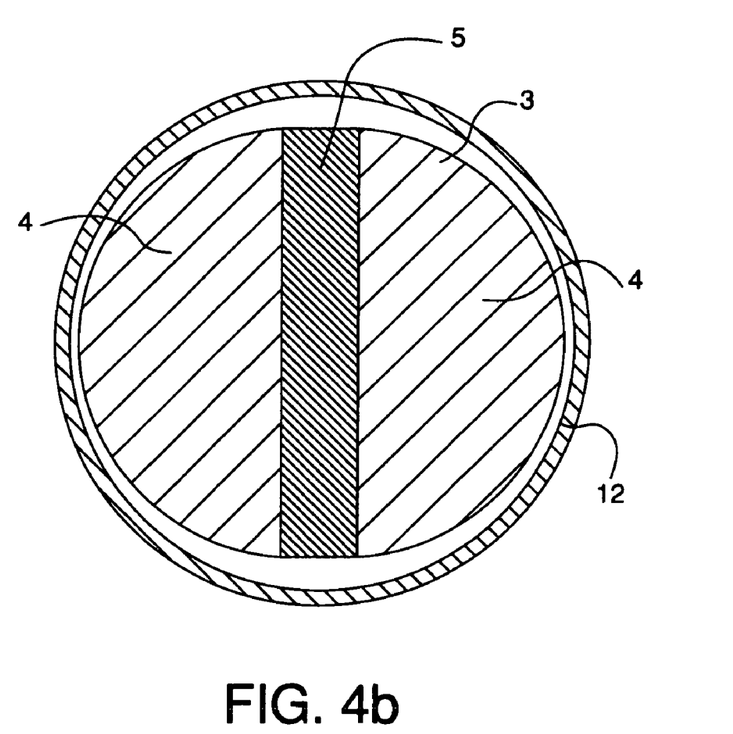

As shown in FIGS. 4a and 4b, the structure 3 may comprise at least two complementary structure segments 4. The term "complementary" means fitting together to complete. Complementary structure segments fit together to complete the structure cross-section, which is conforming to the vessel cross-section.

Figure 5A:
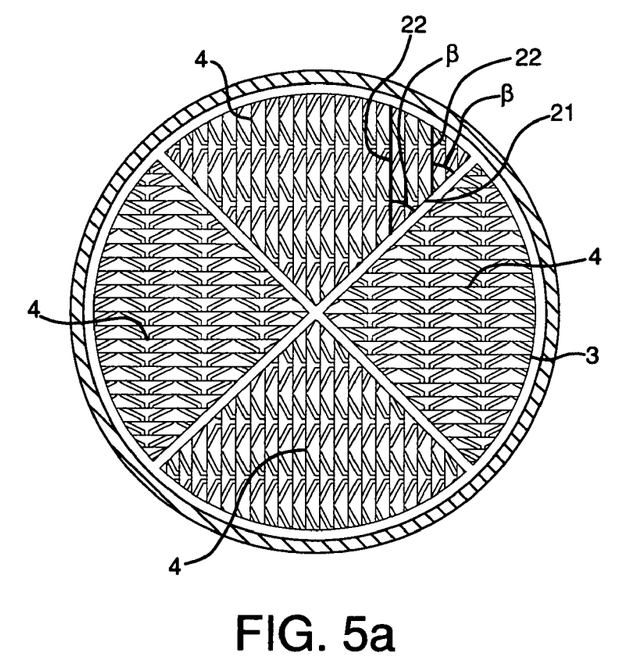
FIG. 5a illustrates a structure having four complementary structure segments and FIG. 5b illustrates an expanded structure with a spreader between the four structure segments.
Figure 5B:
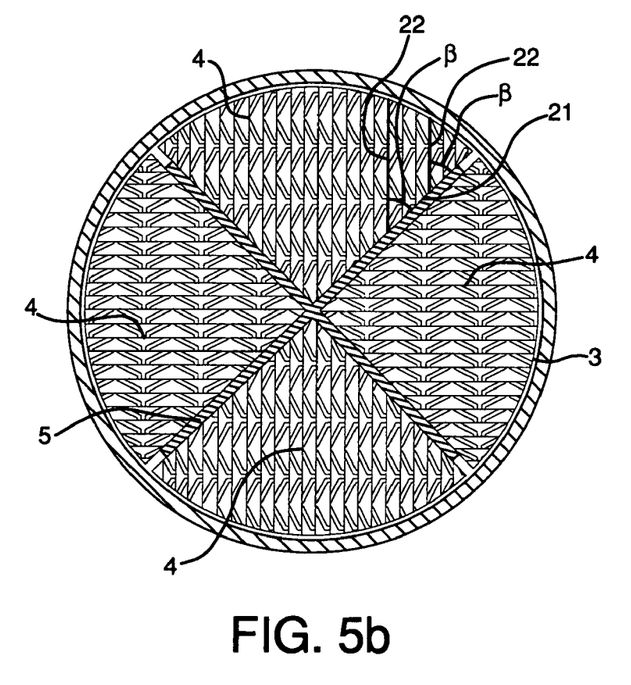

Any desirable number of complementary structure segments may be used. For example, FIGS. 5a and 5b show a structure 3 with four complementary structure segments 4. As shown in FIGS. 5a and 5b, the angle, β, between the nearest inner edge 21 of the structure segment and the flat plates 22 may be 45°±5°. An inner edge 21 of the structure segment is an edge between adjacent structure segments. The nearest inner edge is the inner edge nearer to the referenced plate. The angle, β, between the nearest inner edge of the structure segment and the parallel plates may be generalized for two or more structure segments by the equation $$\beta = \frac{180°}{n} \pm 5°,$$

where n is the number of structure segments.

Referring to FIGS. 4a and 4b, the step of expanding may comprise inserting a spreader 5 between the structure segments 4, thereby expanding the structure 3 toward the inner vessel surface 12. The expansion of the structure 3 decreases the average spacing between the structure 3 and the inner vessel surface 12. The complementary structure segments may define a spreader receiving space between the complementary structure segments. The step of expanding may then comprise inserting a spreader into the spreader receiving space.

Various spreader geometries may be used as illustrated in FIGS. 4b, 5b, 6 and 7. The spreader may be any suitable shape, for example, at least one of a cylinder, bar, rod, cone, plate, strip, a wedge or combination thereof. The spreader may act by simple insertion (axial movement into the structure void), or a combination of insertion and other motion, such as rotation.

Figure 6:
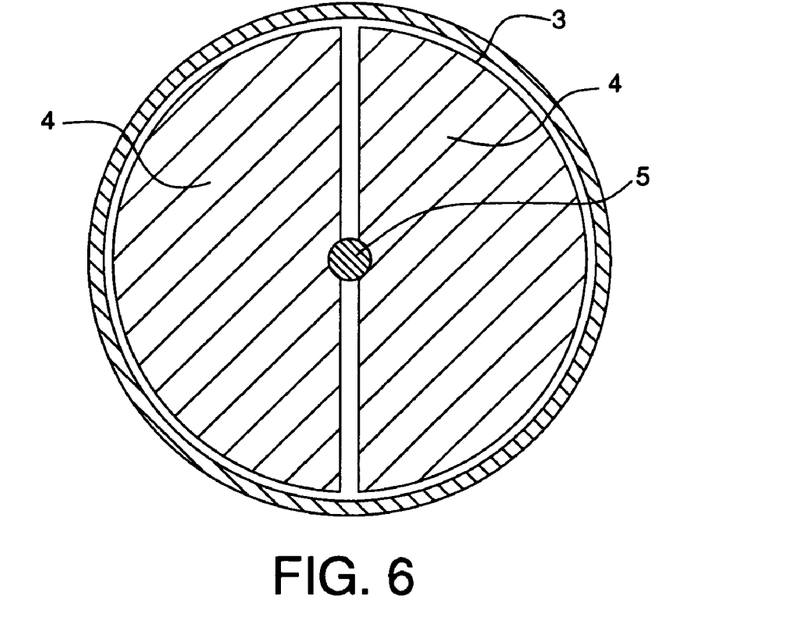
FIG. 6 illustrates, in plan view, another example of the second embodiment of the invention comprising a structure having two complementary structure segments and a spreader that is cylindrically-shaped.
Figure 7:
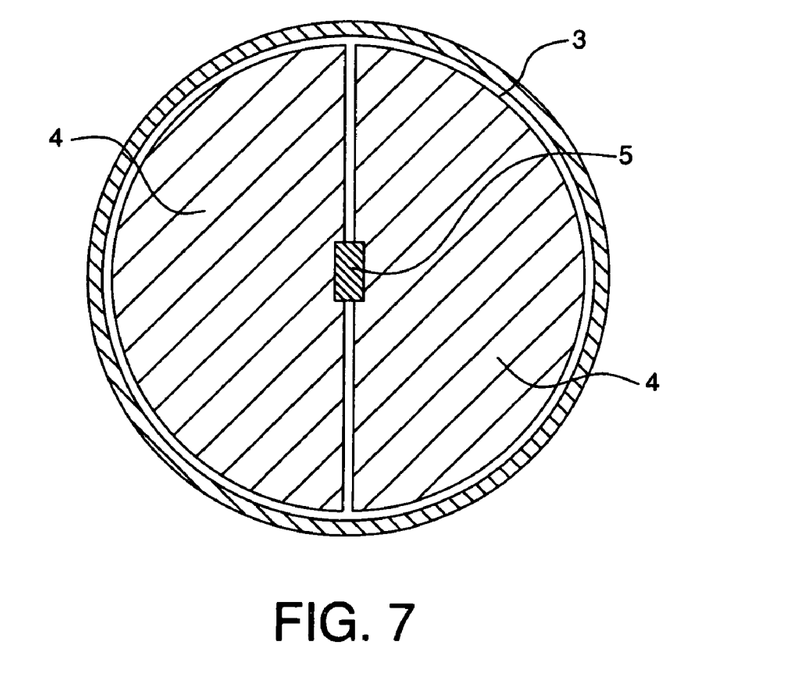
FIG. 7 illustrates, in plan view, another example of the second embodiment comprising a structure having two complementary structure segments and a spreader that is rectangular bar-shaped.

FIG. 6 illustrates, in plan view, an example of the second embodiment according to the invention comprising a structure 3 having two complementary structure segments 4 and a cylindrically-shaped spreader 5. FIG. 7 illustrates, in plan view, another example of the second embodiment according to the invention comprising a structure 3 having two complementary structure segments 4 and a rectangular bar-shaped spreader 5.

Another means for effecting expansion of the structure toward the inner vessel surface comprises compressing the structure prior to the step of introducing the structure into the vessel, constraining the structure by a restraint during the step of introducing the structure into the vessel, and disengaging the restraint.

Prior to introducing the structure into the vessel, the structure may be compressed by any suitable means, for example, a hydraulic press. For the case of alternating corrugated plates and flat plates, the corrugated plates may have a slightly smaller width, thereby exposing surface on the flat plates for applying compression to the structure. A fixture may be used to push on multiple flat plates thereby compressing the structure. Pressure may be applied to all of the flat plates or a fewer number of selected plates. The fixture may be constructed to provide a greater displacement for the outer flat plates relative to the center-located flat plates. As the structure is compressed, the corrugated plates may expand in a direction perpendicular to the compressive force, but since the corrugated plates may have a smaller width, the outer edges of the corrugated plates preferably will not extend beyond the outer edges of the adjacent flat plates.

After the structure has been compressed, tie rods may be inserted into the structure to hold the structure in the compressed state. Holes may be provided in the structure for inserting the tie rods. The tie rod ends may be welded or otherwise attached to the outer flat plates. One end of the tie rods may have a head while the other end is fixed by welding.

Figure 2B:
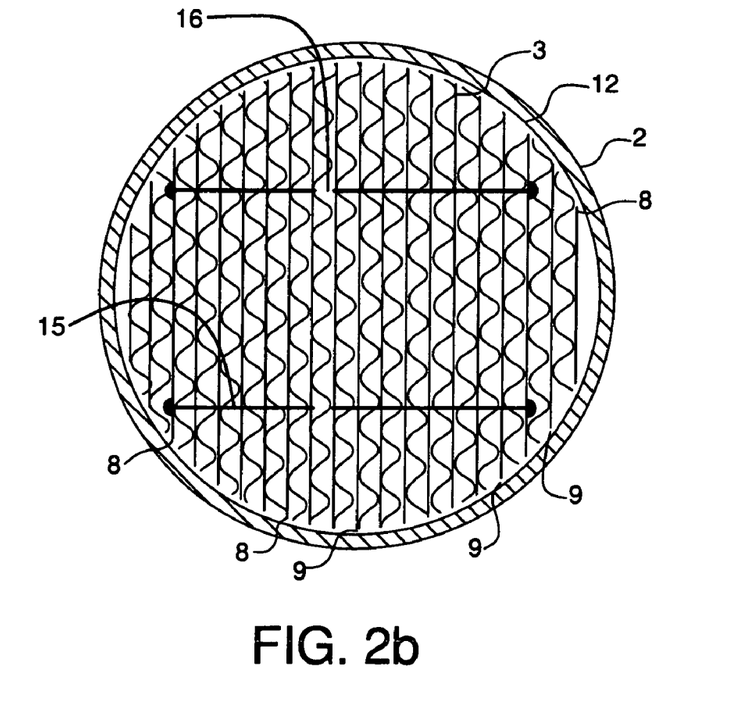

FIGS. 2a and 2b illustrate an example of the first embodiment where the restraint is shown as tie rods 15. The tie rods 15 may be disengaged by cutting or breaking the tie rods as shown by tie rod breaks 16 in FIG. 2b, thereby allowing the structure 3 to expand toward the inner vessel wall 12. Alternatively, the tie rods may be made of a material, for example nylon, which may disengage by softening or melting upon heating.

As shown in FIGS. 2a and 2b, the second average spacing, the sum of the spacings 9 divided by the total number of edges 8 after disengaging the tie rods is less than the first average spacing, the sum of the spacings 7 divided by the total number of edges 8 before disengaging the tie rods.

Figure 8A:
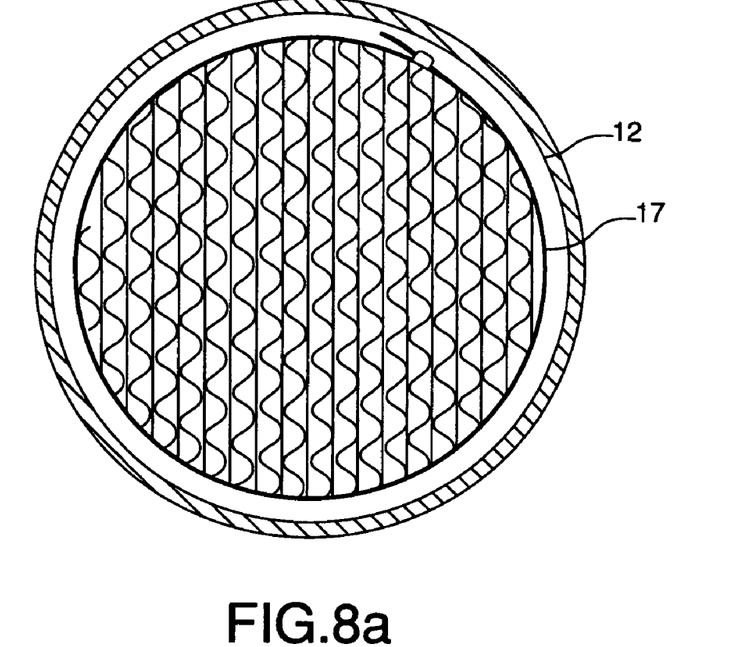
FIG. 8a illustrates a structure constrained by a cable tie and FIG. 8b illustrates an expanded structure and a cleaved cable tie.
Figure 8B:
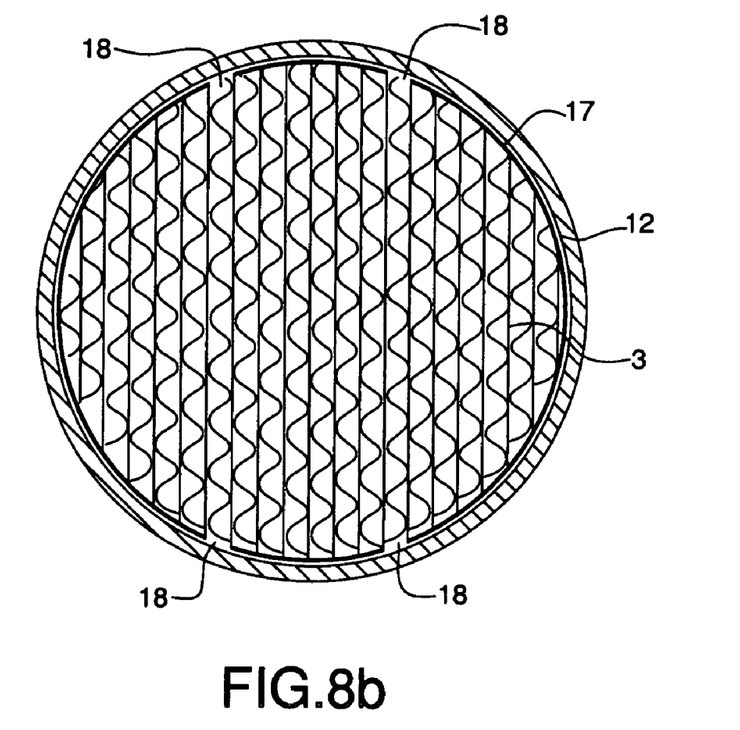

FIGS. 8a and 8b illustrate an example of the first embodiment where the restraint is shown as a cable tie 17. The cable tie 17 may be disengaged by cutting or breaking the cable tie 17 as shown by cable tie break 18 in FIG. 8b, thereby allowing the structure 3 to expand toward the inner vessel wall 12. Alternatively, the cable tie may be made of a material, for example nylon, which may be disengaged by softening or melting upon heating. Various other straps, bands, and the like may also be used as a restraint.

After the step of expanding the structure toward the inner vessel surface, the structure and the vessel define a second average spacing between the structure and the inner vessel surface. The second average spacing is less than the first average spacing. The average spacing between the structure and the inner vessel surface after the step of expanding the structure toward the inner vessel surface may be about 0 to 4 mm or about 0 to 2 mm. The average spacing may approach zero, for example where the spreader is large enough to push the structure against the inner vessel surface and deform the structure.

Example 1

Computational fluid dynamics modeling was used to evaluate the average heat transfer coefficient for a structure composed of corrugated and flat plates, where the assembled structure was composed of two semi-cylindrical segments. The software program FLUENT® was used.

The corrugated plates alternate with flat plates in the structure, and define passages having an angle of 60° to the longitudinal axis of the vessel. The direction of the corrugations alternates, so that the angle between corrugation passages of the nearest corrugated plates was 120°. The peak-to-valley height of the corrugations was 3 mm. The inner diameter of the vessel was 100 mm.

A first calculation was made using a uniform 3 mm wide gap between the cylindrical structure and the cylindrical vessel, representing an average spacing during introduction of a structure into a vessel. This corresponds to the displacement of 0 mm in FIG. 9.

The heat transfer coefficient was evaluated for non-compressible flow of air through the structure, entering 25° C. and 1 atm. and at a superficial velocity of 5 m/s. A constant-heat-flux boundary condition was imposed on the inner vessel surface.

Figure 9:
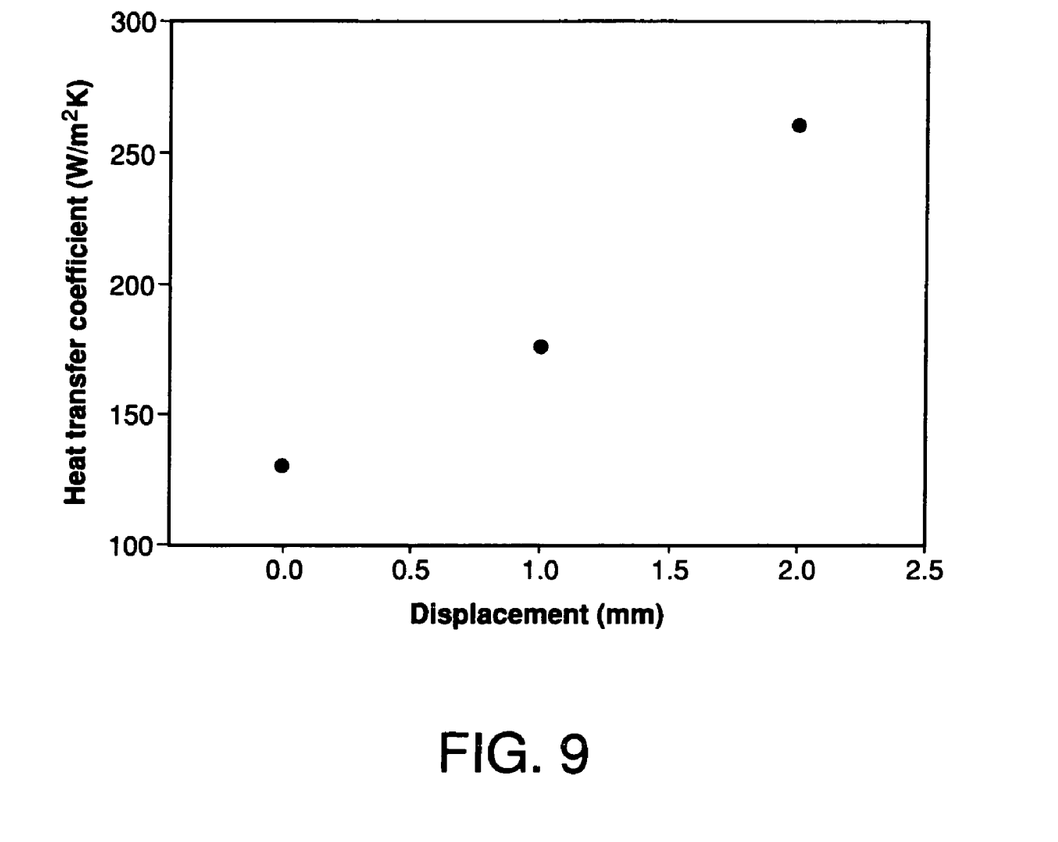
FIG. 9 presents results of computational simulations showing the heat transfer coefficient as a function of displacement of the structure toward the inner surface of the vessel.

As shown in FIG. 9, a heat transfer coefficient of about 130 W/m$^2$K was calculated for a displacement of 0 mm.

In the model, the segments were displaced 1 mm and 2 mm along a vector extending radially, normal to the dividing plane between the segments. The same conditions as the 0 displacement simulation were applied. Heat transfer coefficients of about 175 and 260 were calculated for displacements of 1 mm and 2 mm, respectively, as shown in FIG. 9.

FIG. 9 illustrates that the heat transfer coefficient increases significantly as the structure segments are displaced further toward the inner vessel surface.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

We claim:

1. A method of making a reactor comprising:
   providing a vessel having a vessel longitudinal axis, and an inner vessel surface;
   introducing a structure having a plurality of substantially parallel passages into the vessel to define a first average spacing between the structure and the inner vessel surface, the plurality of substantially parallel passages having a plurality of passage longitudinal axes which are not parallel to the vessel longitudinal axis; and
   expanding the structure toward the inner vessel surface thereby defining a second average spacing between the structure and the inner vessel surface wherein the second average spacing is less than the first average spacing to make the reactor.

2. The method of claim 1 wherein the structure comprises at least two complementary structure segments and wherein the step of expanding the structure comprises inserting a spreader between the at least two complementary structure segments.

3. The method of claim 1 further comprising:
compressing the structure prior to the step of introducing the structure into the vessel; and
constraining the structure by a restraint during the step of introducing the structure into the vessel;
wherein the step of expanding comprises disengaging the restraint.

4. The method of claim 1 wherein the method further comprises:
applying a catalyst to the structure.

5. The method of claim 1 further comprising:
combining a plurality of flat plates and a plurality of corrugated plates to form a number (n) of complementary structure segments greater than 2, wherein a first complementary structure segment from the number (n) of complementary structure segments thereby comprises a first flat plate from the plurality of flat plates and a second flat plate from the plurality of flat plates, the second flat plate parallel to the first flat plate, wherein the first flat plate defines an angle with a nearest inner edge of the first complementary structure segment, wherein the angle is $$\frac{180°}{n} \pm 5°;$$

and
assembling the number (n) of complementary structure segments from the step of combining to form the structure prior to introducing the structure into the vessel;
wherein the step of expanding the structure comprises inserting a spreader between the first complementary structure segment and a second complementary structure segment from the number (n) of complementary structure segments.

* * * * *